(12) United States Patent
Lai

(10) Patent No.: US 10,975,972 B2
(45) Date of Patent: Apr. 13, 2021

(54) CONTROL VALVE CONNECTOR

(71) Applicant: WEN SHENG FU CO., LTD, Chang Hua Hsien (TW)

(72) Inventor: Hung-Lin Lai, Chang Hua Hsien (TW)

(73) Assignee: WEN SHENG FU CO., LTD, Chang Hua Hsien (TW)

( * ) Notice: Subject to any disclaimer, the term of this patent is extended or adjusted under 35 U.S.C. 154(b) by 87 days.

(21) Appl. No.: 16/505,507

(22) Filed: Jul. 8, 2019

(65) Prior Publication Data

US 2021/0010602 A1 Jan. 14, 2021

(51) Int. Cl.
| | |
|---|---|
| *F16K 1/42* | (2006.01) |
| *F16K 11/02* | (2006.01) |
| *F16K 17/02* | (2006.01) |
| *F16K 27/08* | (2006.01) |

(52) U.S. Cl.
CPC ............ *F16K 1/422* (2013.01); *F16K 11/025* (2013.01); *F16K 17/02* (2013.01); *F16K 27/08* (2013.01)

(58) Field of Classification Search
CPC ........ F16K 1/422; F16K 11/025; F16K 17/02; F16K 27/08; F16L 19/0206; F16L 41/023; F16L 41/005; F16L 33/223
See application file for complete search history.

(56) References Cited

U.S. PATENT DOCUMENTS

| | | | | |
|---|---|---|---|---|
| 2,505,303 | A * | 4/1950 | Randa ................... | F16L 41/023 |
| | | | | 285/148.13 |
| 2,862,732 | A * | 12/1958 | Guillou ............... | F16L 19/0206 |
| | | | | 285/342 |
| 4,407,482 | A * | 10/1983 | Daghe ..................... | F16K 27/00 |
| | | | | 251/148 |
| 6,581,593 | B1 * | 6/2003 | Rubin ................. | F16L 19/0206 |
| | | | | 128/202.27 |

* cited by examiner

*Primary Examiner* — Umashankar Venkatesan
*Assistant Examiner* — Andrew J Rost

(57) ABSTRACT

A control valve connector has a valve body, a connecting member, at least two sealing rings and a positioning nut. The valve body has a first connecting opening and at least two second connecting openings, an outer edge of the second connecting opening provided with a threaded section. The first connecting opening is configured for coupling with the positioning nut, and the connecting member is a tubal body having a through aperture and a spherical end.

2 Claims, 7 Drawing Sheets

CONTROL VALVE CONNECTOR

BACKGROUND OF THE INVENTION

Field of the Invention

The present invention relates to a control valve connector, and more particularly to a control valve connector providing an excellent leakage-proof effect.

Description of the Related Art

Currently, traditional control valves have a difficult assembly structure which is complicated for manufacturing and processing. The traditional structure is as shown in FIG. 7, the control valve 60 has a valve body 61 that is provided with an entering opening 611, an exit opening 612 and a chamber. The chamber has a control knob 62 extending toward the outside of the valve body 61 and is able to be rotated to control the flow path between the entering opening 611 and the exit opening 612 due to the blocking or retraction of the control knob 62. Therefore, the control valve 60 is capable of controlling the flow of water.

However, the conventional structure as described above still has the following problems in practical applications: the control knob 62 is simply screwed onto the control valve 60 with a nut 63 to make a maximum rotation distance which cannot effectively stop the water and causes leakage at the nut 63.

Therefore, it is desirable to provide a control valve to mitigate and/or obviate the aforementioned problems.

SUMMARY OF THE INVENTION

An objective of the present invention is to provide a control valve, which is capable of improving the above-mention problems.

In order to achieve the above mentioned objective, a control valve connector has a valve body, a connecting member, at least two sealing rings and a positioning nut. The valve body has a first connecting opening and at least two second connecting openings, an outer edge of the second connecting opening provided with a threaded section. The first connecting opening is configured for coupling with the positioning nut, and the connecting member is a tubal body having a through aperture and a spherical end.

Other objects, advantages, and novel features of invention will become more apparent from the following detailed description when taken in conjunction with the accompanying drawings.

DETAILED DESCRIPTION OF THE PREFERRED EMBODIMENT

Figure 1:
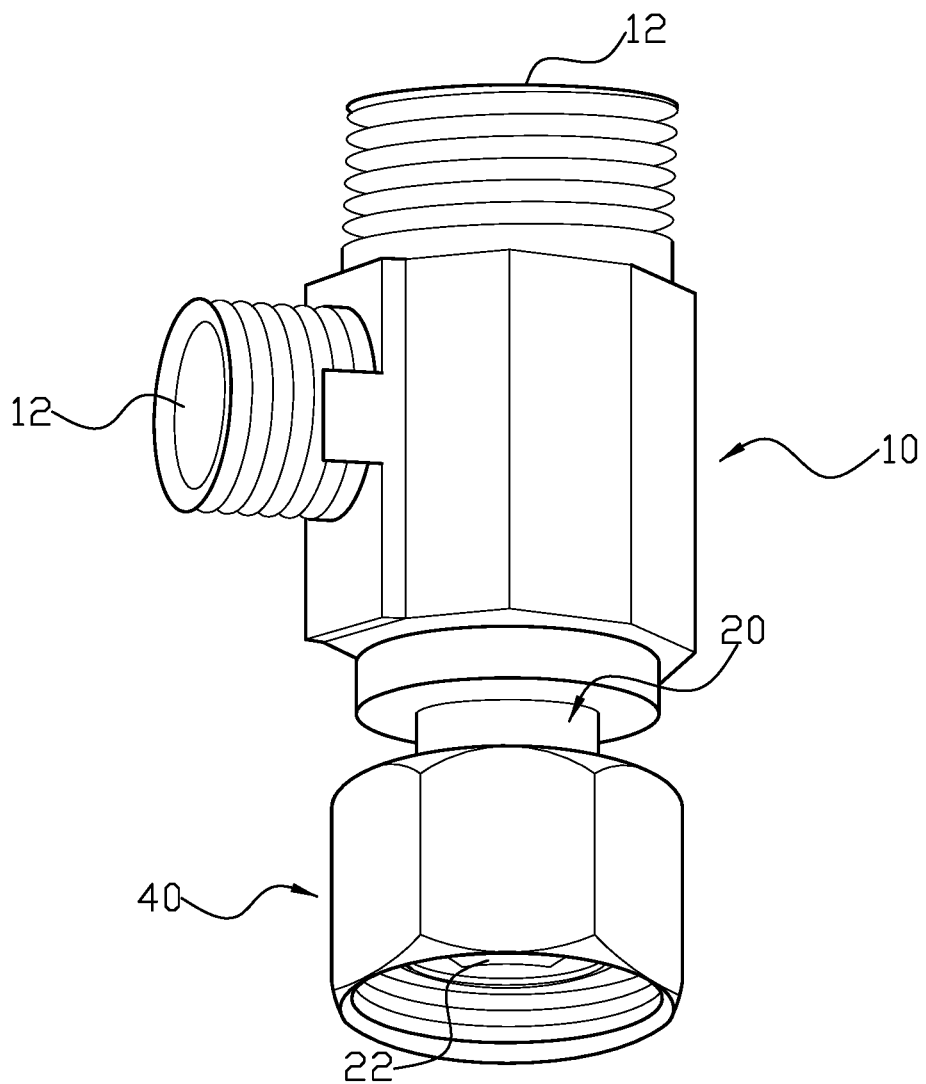
FIG. 1 is a three-dimensional combination of a preferred embodiment of the present invention.
Figure 2:
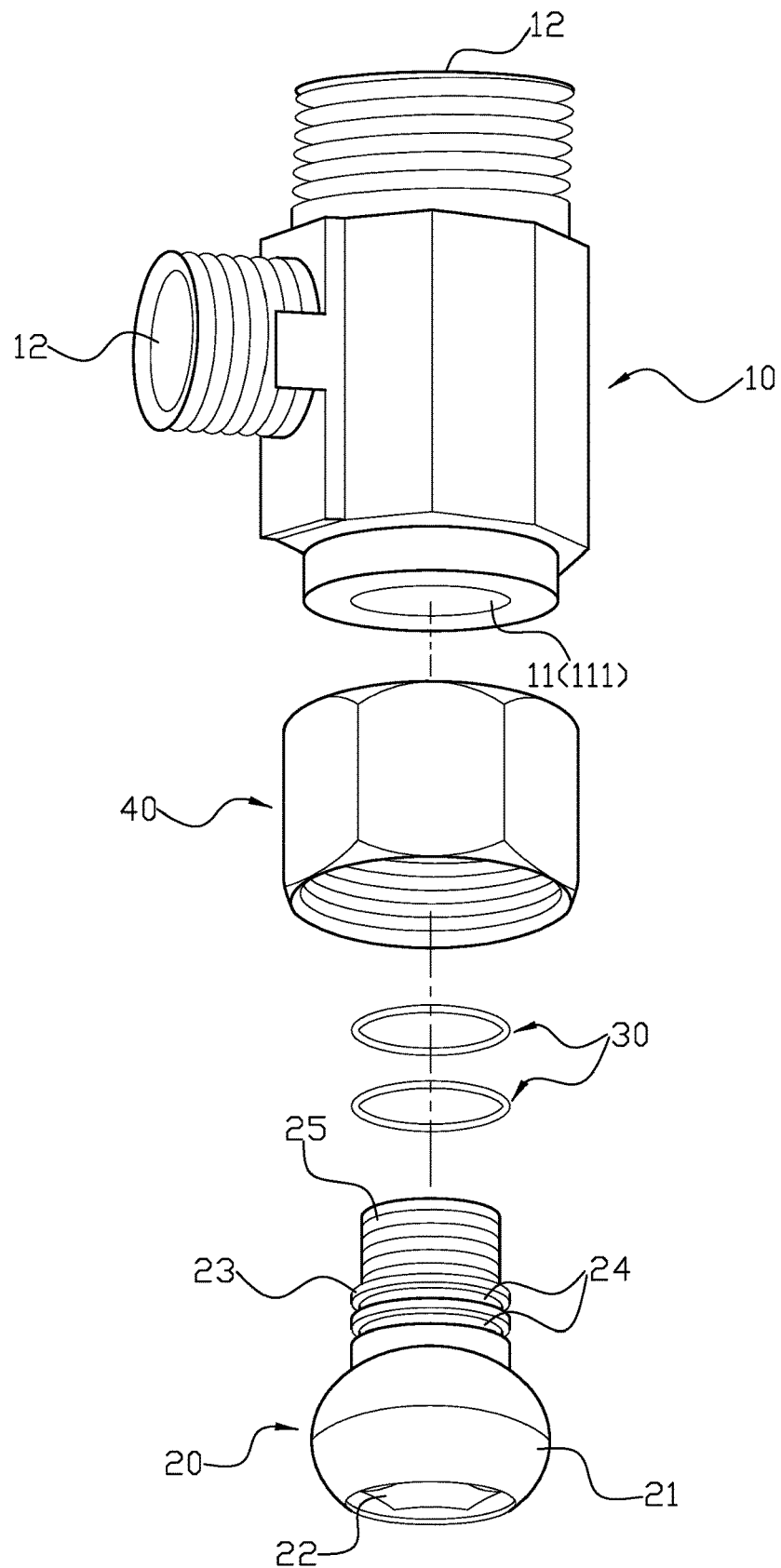
FIG. 2 is a three-dimensional exploded view of the preferred embodiment of the present invention.
Figure 3:
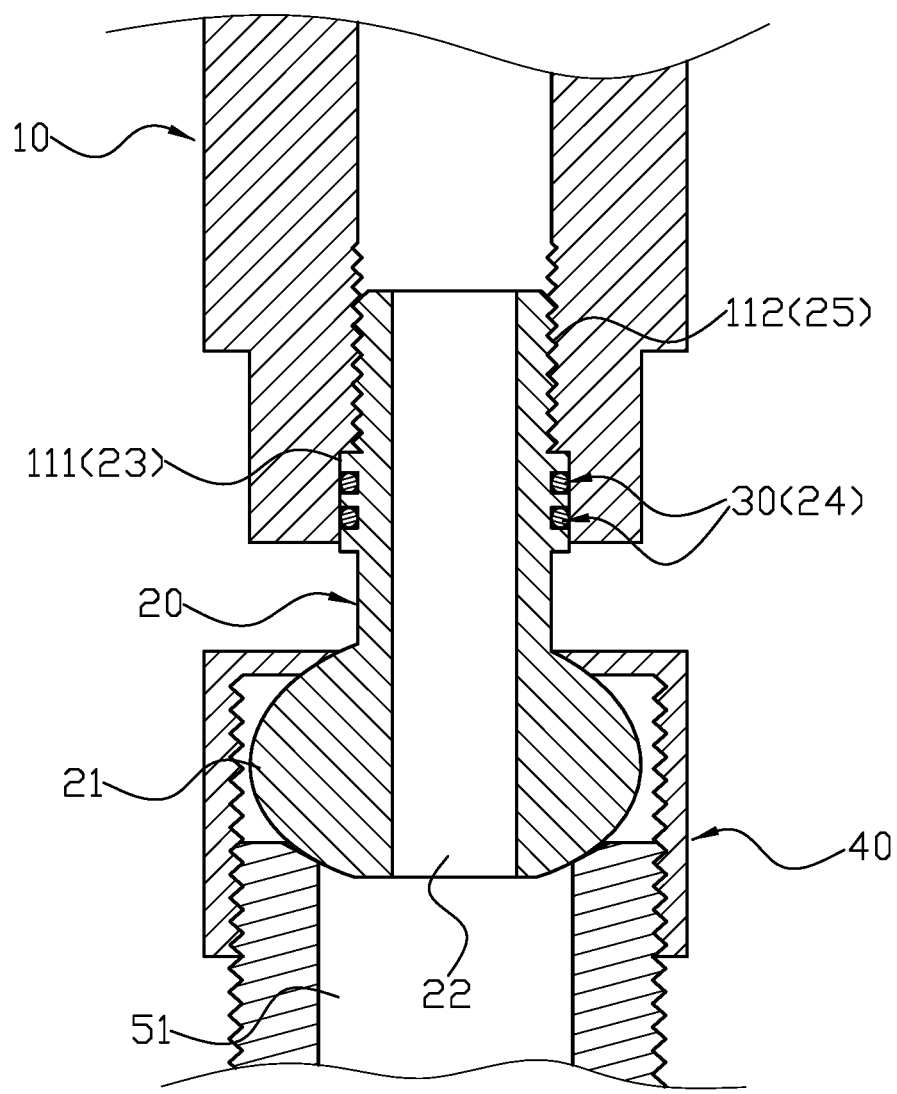
FIG. 3 is a sectional view of the combination of the preferred embodiment of the present invention.
Figure 4:
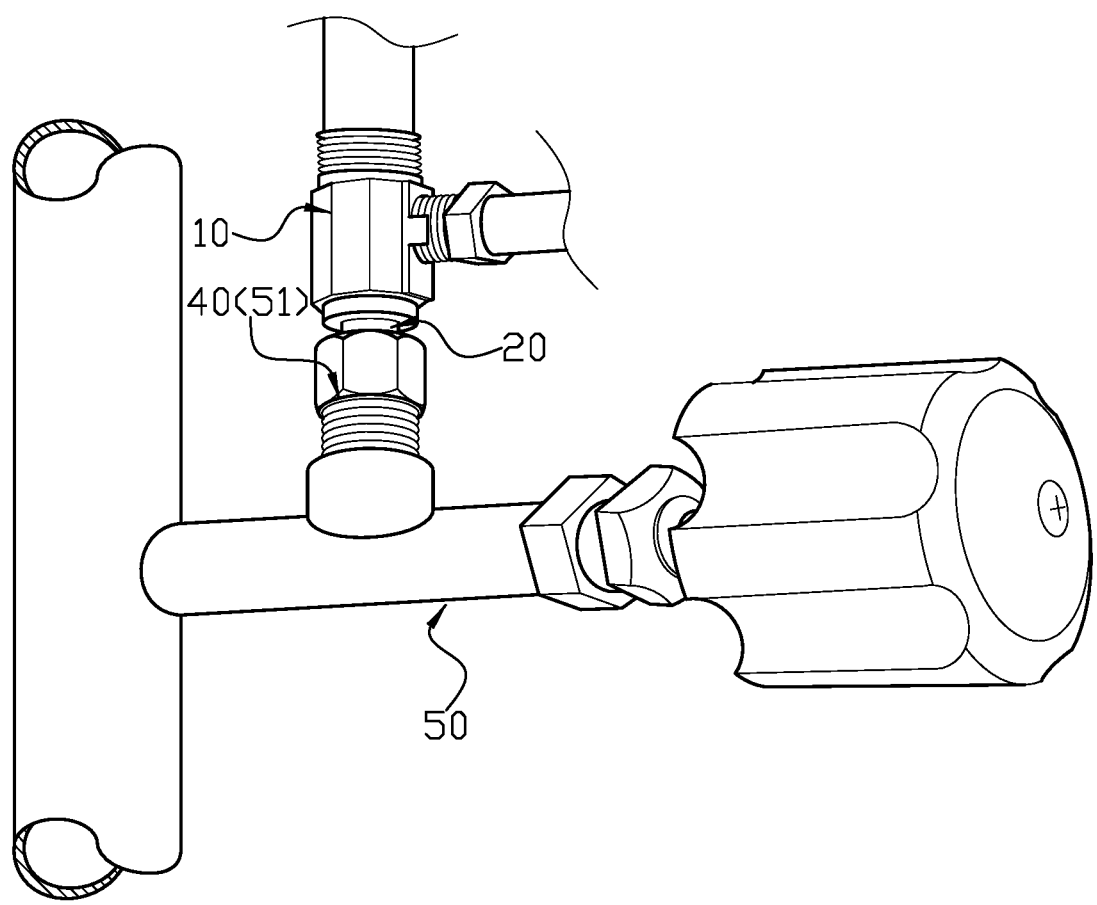
FIG. 4 is a schematic drawing of the use status of the preferred embodiment of the present invention.
Figure 5:
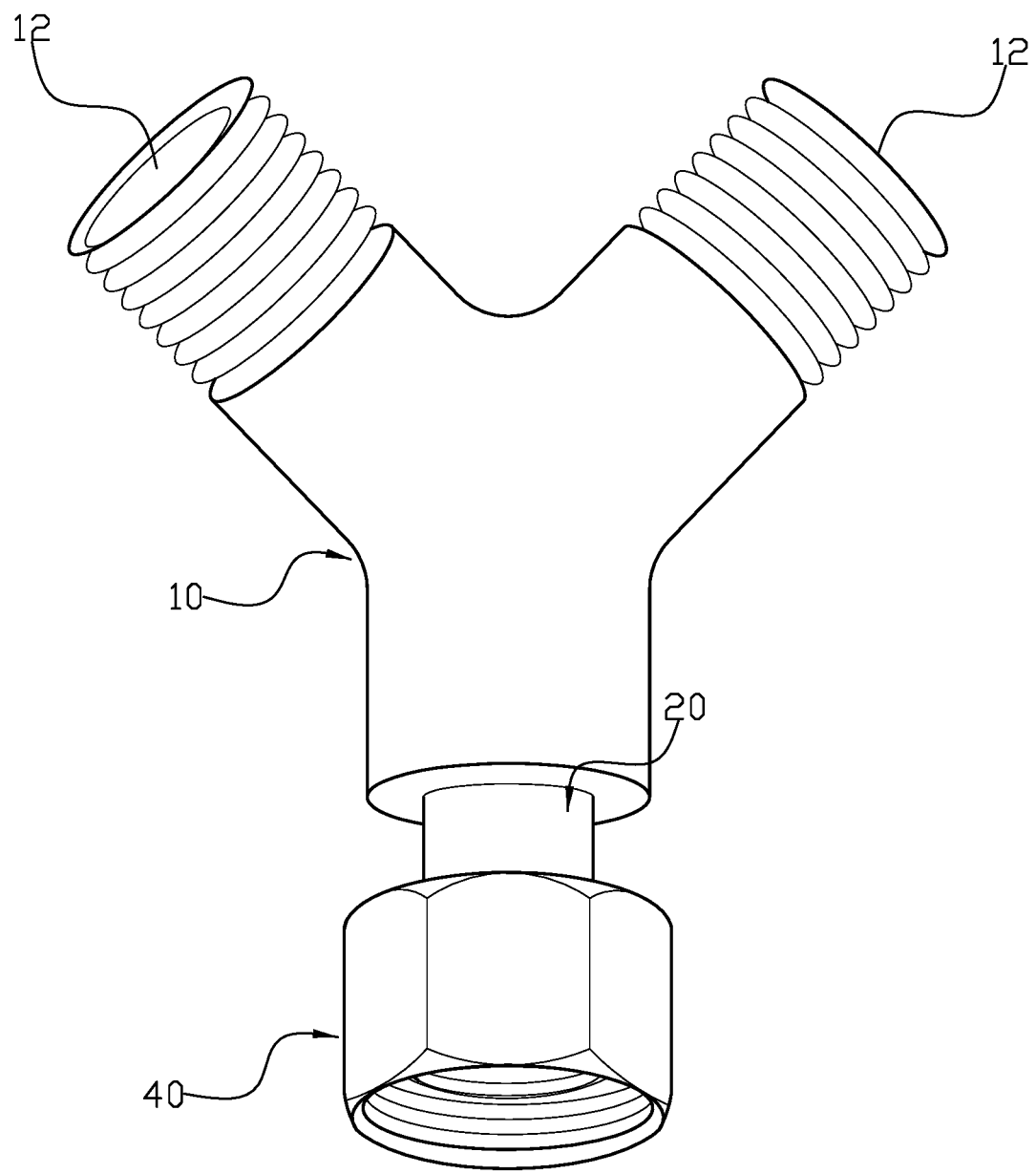
FIG. 5 is a schematic drawing showing another embodiment of the present invention.
Figure 6:
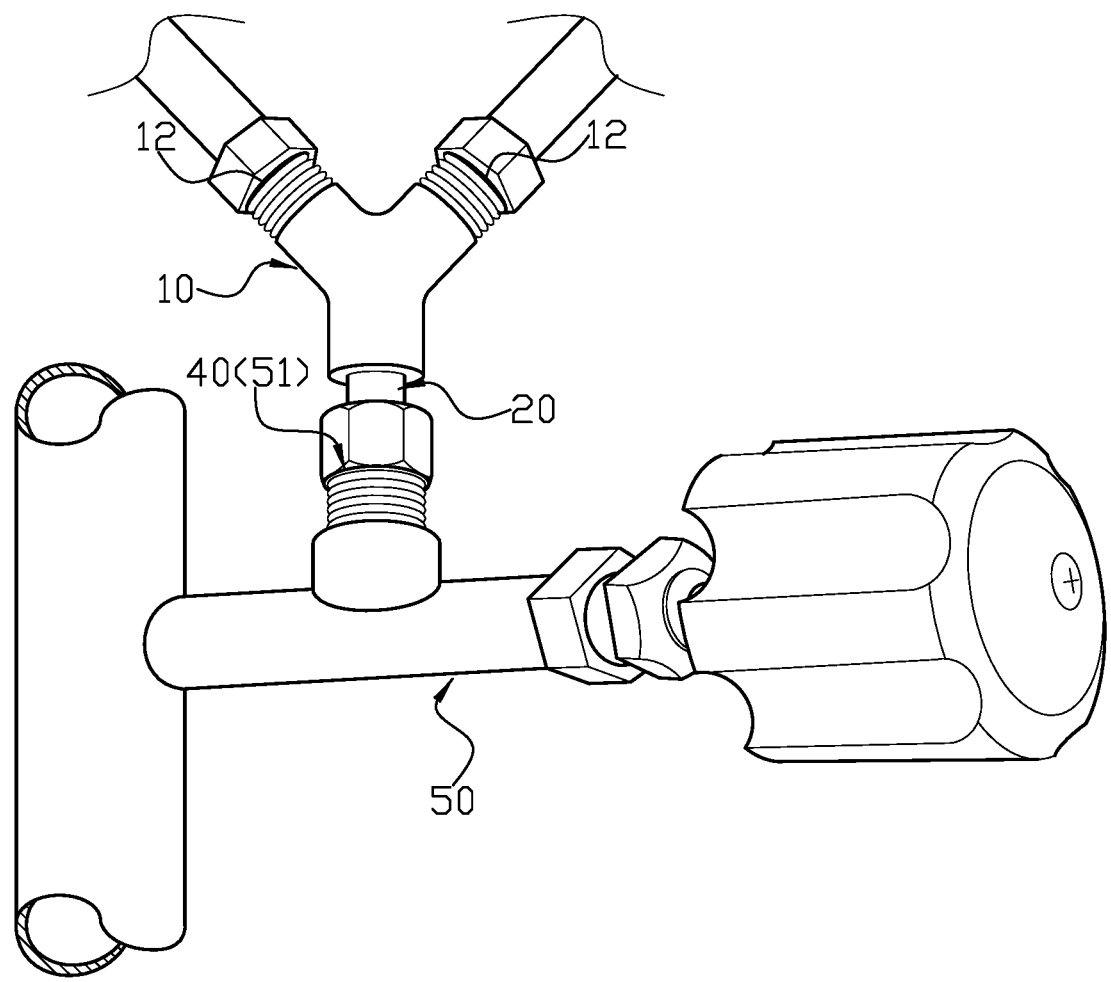
FIG. 6 is schematic drawing of the use status another embodiment of the present invention.
Figure 7:
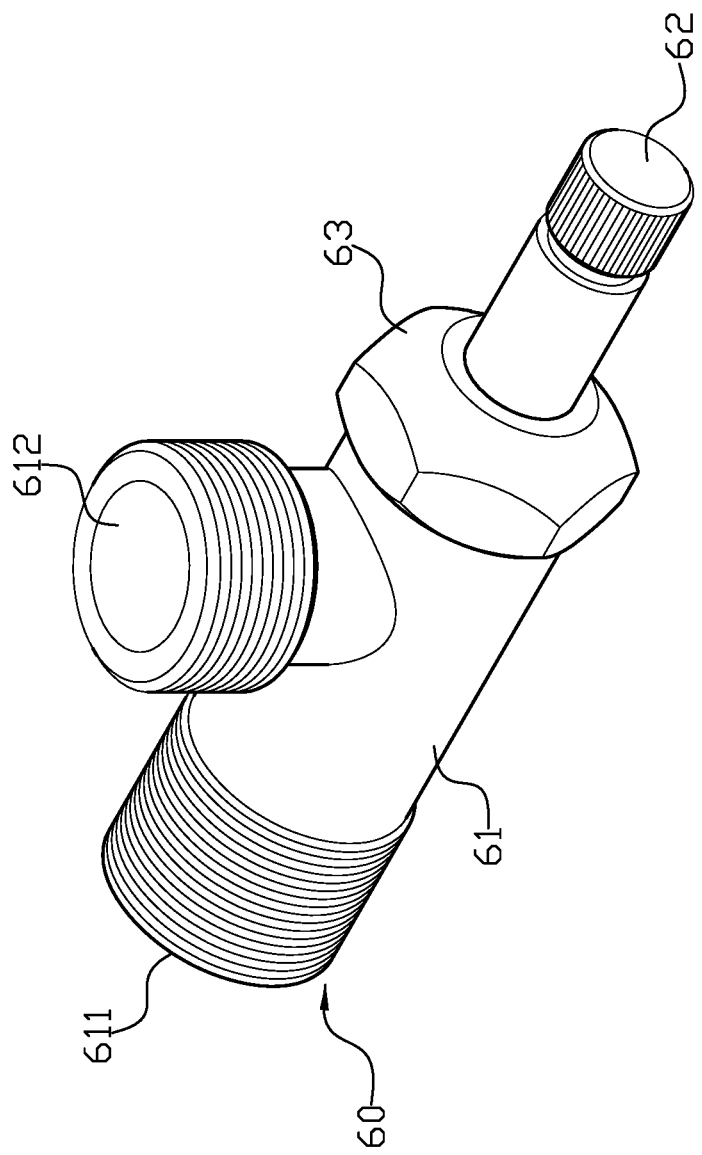
FIG. 7 is a perspective view of a prior art control valve.

First, please refer to FIGS. 1-6. A control valve connector comprises a valve body 10, a connecting member 20, at least two sealing rings 30 and a positioning nut 40. The valve body 10 has a first connecting opening 11 and several second connecting openings 12, an outer edge of the second connecting opening 12 is provided with a threaded section. The first connecting opening 11 is configured for coupling with a positioning nut 40 to be assembled at an opening 51 of a water pipe 50. Each second connecting openings 12 of the valve body 10 has a different angle. The connecting member 20 is a tubal body having a through aperture 22 and a spherical end 21. The first connecting opening 11 of the valve body 10 comprises a first aperture 111 and a second aperture 112. The first aperture 111 is disposed in a sidewall of the valve body 10, and is larger than the second aperture 112. The second aperture 112 is provided with a threaded section for engaging with the connecting member 20. Another end of the connecting member 20 opposite the spherical end 21 has a wider diameter section 23 and a narrower diameter section 25. The wider diameter section 23 is provided with at least two circular grooves for accepting the sealing rings 30 and is adjacent to the sphere end 21. The narrower diameter section 25 is provided with a threaded section. When the narrower diameter section 25 of the connecting member 20 member is inserted into the positioning nut 40 and then locked with the second aperture 112 of the valve body 10, the wider diameter section 23 presses against the threaded section of the second aperture 112 to create a first seal. Then the sealing ring 30 jacketed on the wide diameter section 23 pushes against an inner wall of the first aperture 111 which provides another seal.

When the connector member 20 and the valve body 10 are assembled together, the protrusion of the wider diameter section 23 can prevent the anoxic glue applied to the narrower diameter section 25 from penetrating into the circular groove 24 and causing the sealing ring 30 to harden.

With the structure of the above embodiment, the following benefits can be obtained: when the assembly of the second aperture portion 112, the narrower diameter section 25, the first aperture portion 111, and the wider diameter section 23 is combined with the at least two sealing rings 30, multiple leak-proof effects on the assembly structure of the control valve is created, so that the use of the control valve assembly structure can avoid water leakage at the valve body 10 and the connector member 20.

Although the present invention has been explained in relation to its preferred embodiment, it is to be understood that many other possible modifications and variations can be made without departing from the spirit and scope of invention as hereinafter claimed.

What is claimed is:

1. A control valve connector comprising a valve body, a connecting member, at least two sealing rings and a positioning nut, wherein the valve body has a first connecting opening and at least two second connecting openings, an outer edge of the second connecting opening provided with a threaded section, the first connecting opening configured for coupling with the positioning nut, the connecting member being a tubal body having a through aperture and a spherical end, characterized in that:

the first connecting opening of the valve body comprises a first aperture and a second aperture connected with each other, the first aperture disposed in a sidewall of the valve body and larger than the second aperture, the second aperture provided with a threaded section for engaging with the connecting member; another end of the connecting member comprising a wide diameter section and a narrow diameter section, the wide diameter section is provided with at least two circular grooves for accepting the sealing rings and adjacent to the spherical end, and the narrow diameter section is provided with a threaded section;

wherein the narrow diameter section of the connecting member is inserted into the positioning nut and then locked with the second aperture of the valve body, such that the wide diameter section presses against the threaded section of the second aperture, and the sealing ring jacketed on the wide diameter section pushes against an inner wall of the first aperture.

2. The control valve connector as claimed in claim 1, wherein each second connecting openings of the valve body has a different angle.

* * * * *